United States Patent
Cho et al.

(10) Patent No.: US 9,744,891 B2
(45) Date of Patent: Aug. 29, 2017

(54) LUMBAR SUPPORT ASSEMBLY

(71) Applicant: DAE CHANG SEAT CO., LTD., Gyeongsangbuk-do (KR)

(72) Inventors: Chan Ki Cho, Gwangju (KR); In Ung Yeon, Ulsan (KR)

(73) Assignee: DAE CHANG SEAT CO., LTD., Gyeongsangbuk-do (KR)

( * ) Notice: Subject to any disclaimer, the term of this patent is extended or adjusted under 35 U.S.C. 154(b) by 10 days.

(21) Appl. No.: 14/698,521

(22) Filed: Apr. 28, 2015

(65) Prior Publication Data

US 2016/0288682 A1 Oct. 6, 2016

(30) Foreign Application Priority Data

Apr. 3, 2015 (KR) .......................... 10-2015-0047723

(51) Int. Cl.
*A47C 7/46* (2006.01)
*B60N 2/66* (2006.01)

(52) U.S. Cl.
CPC ......... *B60N 2/6671* (2015.04); *B60N 2/6673* (2015.04)

(58) Field of Classification Search
CPC ....... B60N 2/66; B60N 2/6671; B60N 2/6673
USPC ...................................................... 297/284.4
See application file for complete search history.

(56) References Cited

U.S. PATENT DOCUMENTS

| | | | | |
|---|---|---|---|---|
| 4,072,287 A | * | 2/1978 | Swenson | B60N 2/502 248/421 |
| 4,295,681 A | * | 10/1981 | Gregory | A47C 7/462 297/284.4 |
| 4,354,709 A | * | 10/1982 | Schuster | A43D 3/1433 297/284.4 |
| 4,981,325 A | * | 1/1991 | Zacharkow | A47C 7/405 297/230.14 |

(Continued)

FOREIGN PATENT DOCUMENTS

| | | |
|---|---|---|
| JP | S6137212 A | 2/1986 |
| JP | S6137213 A | 2/1986 |

(Continued)

OTHER PUBLICATIONS

Prior Art Search Report for priority application No. KR 10-2015-0047723 filed Apr. 3, 2015.

(Continued)

*Primary Examiner* — David R Dunn
*Assistant Examiner* — Alexander Harrison
(74) *Attorney, Agent, or Firm* — Zareefa B. Flener; Flener IP Law

(57) ABSTRACT

The present disclosure relates to a lumbar support assembly. The present disclosure provides a lumbar support assembly installed at a seat back frame at the inside of a vehicle seat and configured to support the back region of an occupant, comprising: a suspension mat coupled to the seat back frame; a guide box coupled to the suspension mat; an actuator coupled to the guide box and including a spindle shaft disposed at one side thereof so as to be positioned (Continued)

within the guide box; a pair of spindle nuts screw-coupled to the spindle shaft and slidably moved in opposite directions to each other along with the rotation of the spindle shaft; and a pair of cables coupled at one ends thereof to the seat back frame and coupled at the other ends thereof to the pair of spindle nuts.

5 Claims, 4 Drawing Sheets

(56) References Cited

U.S. PATENT DOCUMENTS

| | | | | |
|---|---|---|---|---|
| 5,217,278 A * | 6/1993 | Harrison | ............ | B60N 2/0296 |
| | | | | 192/48.91 |
| 5,299,851 A * | 4/1994 | Lin | .............. | A47C 7/465 |
| | | | | 297/284.4 |
| 5,984,407 A * | 11/1999 | Ligon, Sr. | ............. | B60N 2/66 |
| | | | | 297/284.1 |
| 6,254,186 B1 * | 7/2001 | Falzon | .............. | B60N 2/66 |
| | | | | 297/284.1 |
| 6,357,826 B1 * | 3/2002 | Gabas | .............. | B60N 2/66 |
| | | | | 297/284.4 |
| 6,402,246 B1 * | 6/2002 | Mundell | ............. | A47C 7/465 |
| | | | | 297/284.4 |
| 6,520,580 B1 * | 2/2003 | Hong | .............. | B60N 2/4435 |
| | | | | 297/284.4 |
| 6,631,951 B2 * | 10/2003 | Blendea | ............ | B60N 2/0232 |
| | | | | 297/284.4 |
| 6,676,214 B2 * | 1/2004 | McMillen | ............. | B60N 2/48 |
| | | | | 297/284.1 |
| 6,938,955 B2 * | 9/2005 | VanSickle | ............ | A47C 7/465 |
| | | | | 297/284.2 |
| 7,007,568 B2 * | 3/2006 | MacAulay | ............ | B60N 2/66 |
| | | | | 297/284.4 |
| 7,140,681 B2 * | 11/2006 | McMillen | ............ | B60N 2/449 |
| | | | | 297/284.4 |
| 7,770,972 B2 * | 8/2010 | Popa | .............. | B60N 2/0296 |
| | | | | 297/284.4 |
| 8,091,966 B2 * | 1/2012 | Schweizer | ............ | B60N 2/66 |
| | | | | 297/284.7 |
| 8,091,967 B2 * | 1/2012 | Schweizer | ............ | B60N 2/0232 |
| | | | | 297/284.7 |
| 2002/0195854 A1 * | 12/2002 | Hong | .............. | B60N 2/66 |
| | | | | 297/284.4 |
| 2003/0006636 A1 * | 1/2003 | Ligon, Sr. | ............. | A47C 7/46 |
| | | | | 297/284.4 |
| 2004/0104609 A1 * | 6/2004 | Blendea | ............ | A47C 7/465 |
| | | | | 297/284.4 |
| 2004/0108760 A1 * | 6/2004 | McMillen | ............ | B60N 2/6671 |
| | | | | 297/284.4 |
| 2004/0160099 A1 * | 8/2004 | Hong | .............. | B60N 2/667 |
| | | | | 297/284.4 |
| 2006/0244293 A1 * | 11/2006 | Buffa | .............. | B60N 2/66 |
| | | | | 297/284.4 |
| 2007/0108816 A1 * | 5/2007 | McQueen | ............ | A47C 7/465 |
| | | | | 297/284.4 |
| 2008/0164738 A1 * | 7/2008 | Colja | .............. | B60N 2/66 |
| | | | | 297/284.4 |
| 2008/0217978 A1 | 9/2008 | Stossel et al. | | |
| 2010/0033002 A1 * | 2/2010 | Di Giusto | ............ | B60N 2/66 |
| | | | | 297/284.2 |
| 2011/0115268 A1 * | 5/2011 | Maierhofer | .......... | A47C 7/465 |
| | | | | 297/284.4 |
| 2011/0127817 A1 * | 6/2011 | Yu | .............. | B60N 2/66 |
| | | | | 297/284.4 |
| 2013/0341982 A1 * | 12/2013 | Maierhofer | .......... | A47C 7/465 |
| | | | | 297/284.4 |
| 2014/0070583 A1 * | 3/2014 | McMillen | ............ | B60N 2/66 |
| | | | | 297/284.4 |
| 2014/0070584 A1 * | 3/2014 | McMillen | ............ | B60N 2/0232 |
| | | | | 297/284.4 |
| 2014/0125101 A1 * | 5/2014 | Hong | .............. | B60N 2/66 |
| | | | | 297/284.4 |
| 2014/0125102 A1 * | 5/2014 | McMillen | ............ | B60N 2/66 |
| | | | | 297/284.4 |
| 2014/0125103 A1 * | 5/2014 | Suzuki | ............. | B60N 2/66 |
| | | | | 297/284.7 |
| 2015/0305506 A1 * | 10/2015 | Suzuki | ............. | B60N 2/66 |
| | | | | 297/284.4 |

FOREIGN PATENT DOCUMENTS

| | | |
|---|---|---|
| JP | H01143958 U | 10/1989 |
| JP | H0819452 A | 1/1996 |
| JP | 2003159149 A | 6/2003 |
| JP | 2014094598 A | 5/2014 |
| KR | 101149075 B1 | 3/2011 |
| KR | 101388983 B1 | 4/2014 |
| KR | 1020140048743 A | 4/2014 |
| KR | 101491313 B1 | 2/2015 |

OTHER PUBLICATIONS

EPO Search Report and Examination for EP15165266 (related application), dated Oct. 5, 2015.

* cited by examiner

< a >

< b >

LUMBAR SUPPORT ASSEMBLY

CROSS-REFERENCE TO RELATED APPLICATION

This application is based on and claims priority from Korean Patent Application No. 10-2015-0047723 filed on Apr. 3, 2015 in the Korean Intellectual Property Office, the disclosure of which is incorporated herein in its entirety by reference.

TECHNICAL FIELD

The present disclosure relates to a lumbar support assembly, and more particularly, to a lumbar support assembly which is installed at the inside of a seat back frame of a vehicle to support the lumbar and back regions of an occupant in the vehicle.

BACKGROUND OF THE INVENTION

A seat is installed at the inside of the vehicle so that an occupant can be seated on the seat, which is composed of a seat cushion that supports the gluteal region of the occupant, a seat back that supports the back region of the occupant, armrests that enables the occupant's arms to put thereon, and a headrest that supports the head of the occupant.

Among these elements, the seat back associated with the present invention will be discussed hereinafter in detail. A seat back frame is installed at the inside of the seat back so as to serve as a framework of the seat back, and a lumbar support assembly is installed at the inside of the seat back frame so as to support the back region of the occupant.

The lumbar support assembly has a variable structure that can fit the spinal shape of the occupant in order to reduce the fatigue of the occupant during the driving of the vehicle.

The lumbar support assembly will be described hereinafter. A protrusion is formed on a rotary bar that is rotatably coupled to the seat back frame, and then a support member is installed on the protrusion to support the lumbar region of the occupant so that the rotary bar is rotated to cause the support member to be moved in the forward and backward directions of the seat back frame depending on the posture of the occupant who is seated on the seat so as to support the lumbar region of the occupant.

However, this conventional lumbar support assembly entails a problem in that it is assembled and manufactured by a number of parts, thus leading in increases in the failure rate and the manufacturing cost and time, and in that vibration and shock generated depending on road or traffic conditions during the driving of the vehicle are transferred to the lumbar region of the occupant through the protrusion to make the occupant feel fatigue easily or cause a risk of injury to him or her.

SUMMARY OF THE INVENTION

Accordingly, the present disclosure has been made to solve the aforementioned problems occurring in the prior art, and it is an object of the present disclosure to provide a lumbar support assembly which can adjust the degree of protrusion of a lumbar support depending on the physical condition of an occupant and can be modularized as a simple structure to reduce the manufacturing cost and time, thereby improving the price competitiveness.

To achieve the above object, in accordance with an embodiment of the present disclosure, there is provided a lumbar support assembly installed at a seat back frame at the inside of a vehicle seat and configured to support the back region of an occupant, including: a suspension mat coupled to the seat back frame; a guide box coupled to the suspension mat; an actuator coupled to the guide box and including a spindle shaft disposed at one side thereof so as to be positioned within the guide box; a pair of spindle nuts screw-coupled to the spindle shaft and slidably moved in opposite directions to each other along with the rotation of the spindle shaft; and a pair of cables coupled at one ends thereof to the seat back frame and coupled at the other ends thereof to the pair of spindle nuts.

The guide box may be formed in a half-divided shape so as to be composed of upper and lower housings that are coupled to each other, and the upper and lower housings may have a pair of guide grooves respectively formed on the opposed inner surfaces thereof so as to confront each other.

The upper and lower housings may have a pair of guide protrusions longitudinally formed on the guide grooves respectively formed on the opposed inner surfaces thereof.

Each of the pair of spindle nuts may have an upper rib formed on a top thereof and two side ribs respectively formed at both sides thereof so as to be symmetrical with each other, so that each of the pair of guide protrusions is seated between the two side ribs.

The suspension mat may include at least one tension spring disposed at both upper sides thereof so as to be coupled to the seat back frame.

The seat back frame may include a pair of coupling members disposed at predetermined lengthwise positions of both sides thereof so that the respective one ends of the pair of cables are coupled to the pair of coupling members, and each of the coupling members may include a body coupled to the predetermined lengthwise position of each of both sides of the seat back frame, an incision groove formed at a predetermined position of the body, and a seating part formed in the body so as to fluidically communicate with the incision groove, the seating part having an inclined surface formed on the inner peripheral surface thereof in a shape which is gradually reduced in width as it goes toward the bottom from the top thereof.

The lumbar support assembly in accordance with an embodiment of the present disclosure as constructed above has the following advantages.

The lumbar support assembly can adjust the degree of protrusion of a lumbar support depending on the physical condition of an occupant and can be modularized as a simple structure to reduce the manufacturing cost and time, thereby improving the price competitiveness.

BRIEF DESCRIPTION OF THE DRAWINGS

The above objects, other features and advantages of the present disclosure will become more apparent by describing the preferred embodiments thereof with reference to the accompanying drawings, in which.

Figure 1:
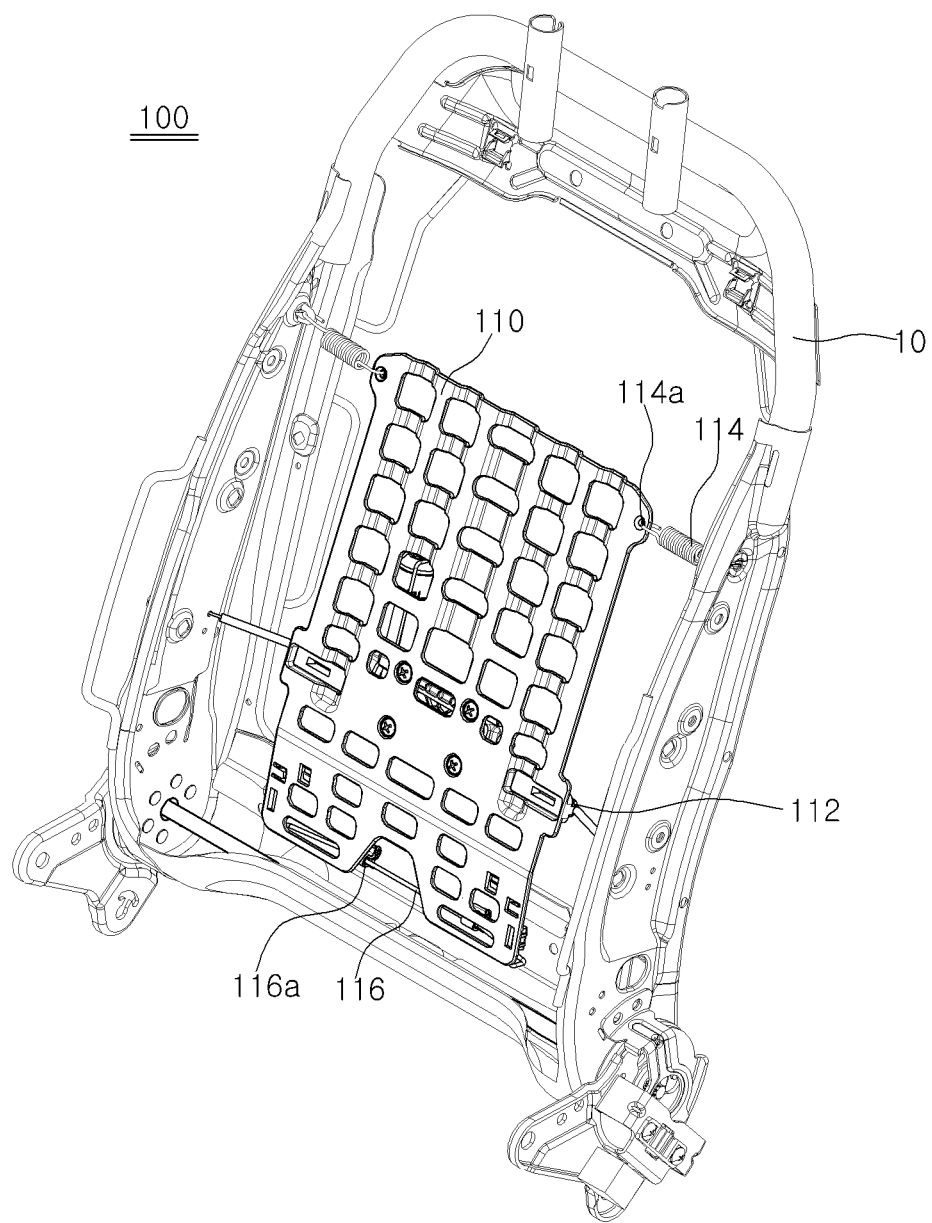
FIG. 1 is an assembled perspective view showing a lumbar support assembly in accordance with an embodiment of the present disclosure.

EXPLANATION ON REFERENCE NUMERALS
OF MAIN ELEMENTS IN THE DRAWINGS

110: suspension mat
140b: side rib
112: cable insertion part
142: insertion hole
114: tension spring
144: coupling groove
114a: coupling hook
150: cable
116: fixed wire
160: coupling member
116a: wire clip
162: body
120: guide box
164: incision groove
122: upper housing
166: seating part
124: lower housing
166a: inclined surface
126: guide groove
126a: guide protrusion
130: actuator
132: gear box
132a: spindle shaft
133: stopper
134: motor
136: clamp
140: spindle nut
140a: upper rib

DETAILED DESCRIPTION OF THE
INVENTION

Reference will now be made in detail to embodiments of the present disclosure, examples of which are illustrated in the accompanying drawings. While the present disclosure will be described in conjunction with the following embodiments, it will be understood that they are not intended to limit the present disclosure to these embodiments alone. On the contrary, the present disclosure is intended to cover alternatives, modifications, and equivalents which may be included within the spirit and scope of the present disclosure as defined by the appended claims. Furthermore, in the following detailed description of the present disclosure, numerous specific details are set forth in order to provide a thorough understanding of the present disclosure. However, embodiments of the present disclosure may be practiced without these specific details.

For the sake of convenience for explanation, the thickness of lines or the size of constituent elements shown in the drawings may be illustrated exaggeratingly for the clarity and convenience of description.

Also, the terms of constituent elements, which will be described hereinafter, are defined in consideration of their functions in the present disclosure and may be changed according to the intention of a user or an operator, or according to the custom. Accordingly, definitions of these terms must be based on the overall description herein.

Figure 2:
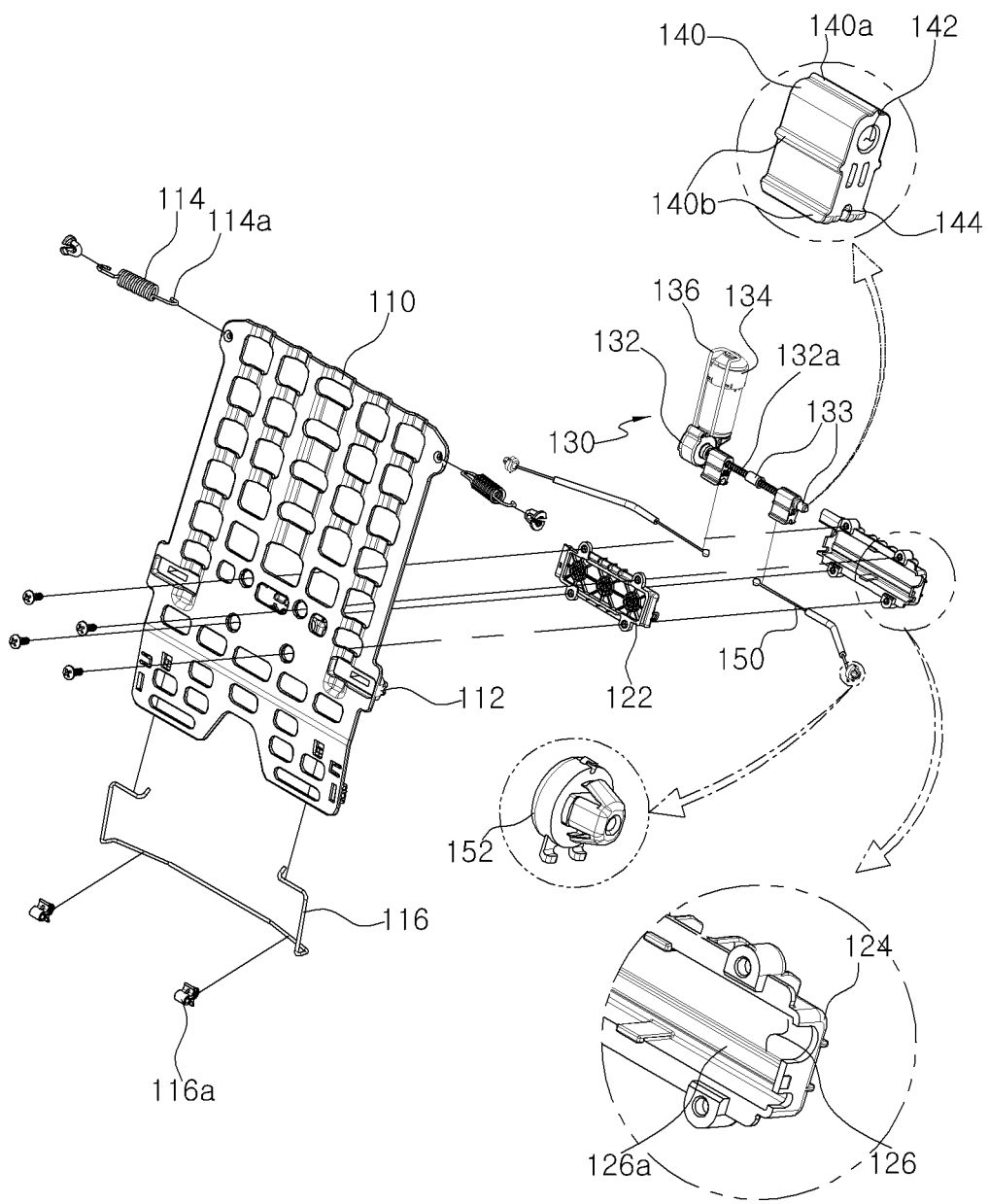
FIG. 2 is an exploded perspective view showing a lumbar support assembly in accordance with an embodiment of the present disclosure.
Figure 3:
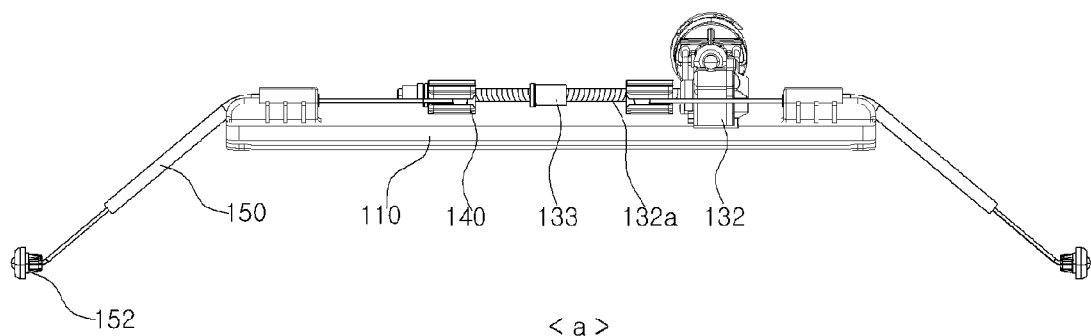
FIG. 3 is a view showing the operation of a cable according to the movement of a spindle nut shown in FIG. 2.
Figure 3:
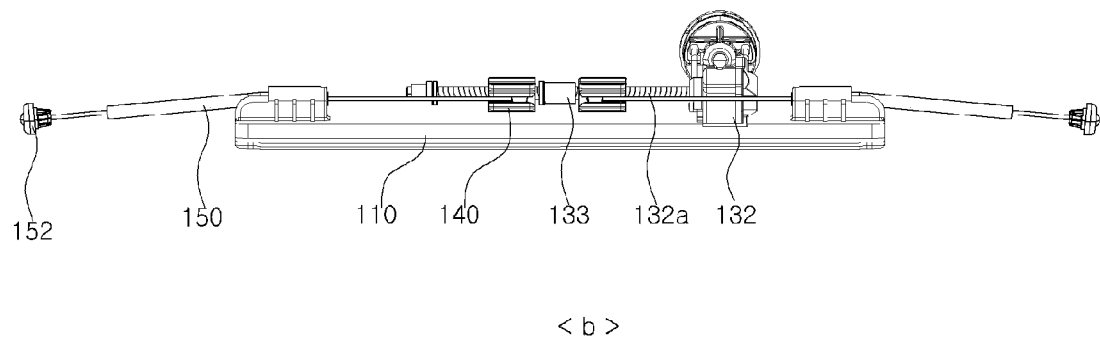
Figure 4:
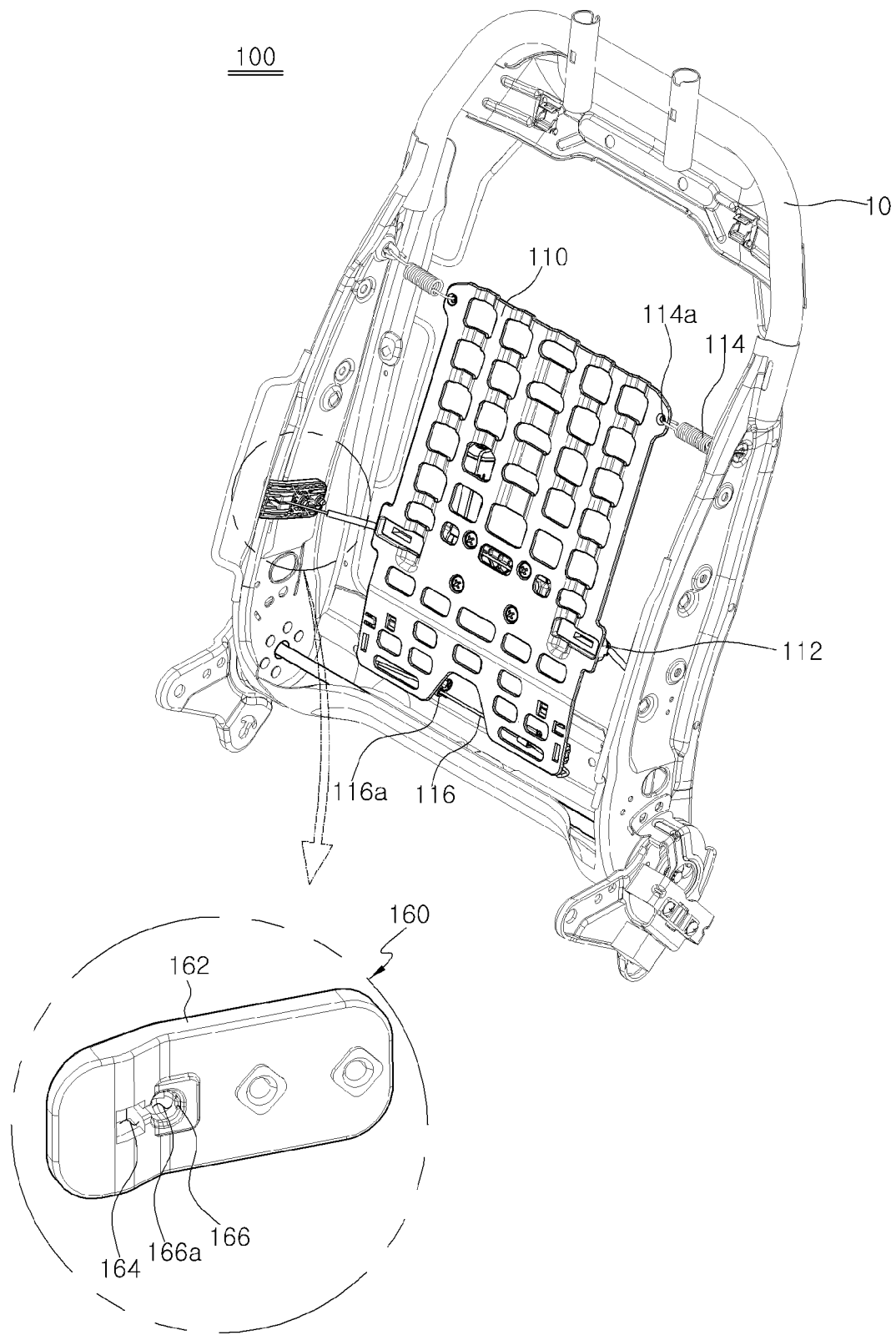
FIG. 4 is a perspective view showing a state in which cables are coupled to a seat back frame through a coupling member.

FIG. 1 is an assembled perspective view showing a lumbar support assembly in accordance with an embodiment of the present disclosure, FIG. 2 is an exploded perspective view showing a lumbar support assembly in accordance with an embodiment of the present disclosure, FIG. 3 is a view showing the operation of a cable according to the movement of a spindle nut shown in FIG. 2, and FIG. 4 is a perspective view showing a state in which cables are coupled to a seat back frame through a coupling member.

Referring to FIGS. 1 to 4, a lumbar support assembly 100 in accordance with an embodiment of the present disclosure is installed at a seat back frame 10 disposed at the inside of a vehicle seat and serves to support the back region of an occupant. The lumbar support assembly 100 includes a suspension mat 110, a guide box 120, an actuator 130, a pair of spindle nuts 140, and a pair of cables 150.

Herein, the seat back frame 10 is installed at the inside of a seat back of the vehicle to maintain the shape of the seat back, and is connected to a seat cushion to support a load of the occupant. The seat back frame 10 is formed in a shape corresponding to the contour of the seat back.

The suspension mat 110 is coupled to the seat back frame 10 to support the lumbar and back regions of a vehicle occupant, and is made of a synthetic resin or a metal material.

In addition, a pair of cable insertion parts 112 is formed at predetermined positions of both widthwise sides of a central portion of the suspension mat 110 so that a pair of cables 150 which will be described later is inserted at predetermined lengthwise positions thereof into the cable insertion parts.

In this case, an upper portion of the suspension mat 110 is elastically supported by at least one tension spring 114. In other words, a coupling hook 114a is formed at both ends of the tension spring 114, respectively. Coupling hooks formed at one sides of both tension springs 114 are respectively coupled to both sides of the seat back frame 10, and coupling hooks formed at the other sides of both tension springs 114 are respectively coupled to both sides of the suspension mat 110.

Further, a lower portion of the suspension mat 110 is coupled to the seat back frame 10 by means of a fixed wire 116 coupled to a lower portion of the seat back frame 10 by means of a pair of wire clips 116a.

The guide box 120 is coupled to the suspension mat 110 so that when a spindle nut 140 which will be described later is slidably moved along with the rotation of a spindle shaft 132a, it is not rotated together with the spindle shaft 132a.

The guide box 120 is formed in a half-divided shape so as to be composed of upper and lower housings 122 and 124 that are coupled to each other, and the upper and lower housings 122 and 124 have a pair of guide grooves 126 respectively formed on the opposed inner surfaces thereof so as to confront each other.

When the upper and lower housings 122 and 124 are coupled to each other, the guide grooves 126 respectively formed on the opposed inner surfaces of the upper and lower housings 122 and 124 define a space (not shown) within the guide box 120. In the space, are positioned the spindle shaft 132a which will be described later and the spindle nut 140 screw-coupled to the spindle shaft 132a so as to be slidably moved along the spindle shaft 132a.

In addition, a guide protrusion 126a is formed on each of the guide grooves 126 along a longitudinal direction of the guide groove, and guides the slidable movement of the spindle nut 140 that is screw-coupled to the spindle shaft 132a so as to be slidably moved along the spindle shaft 132a.

The actuator 130 is coupled to the guide box 120 and includes the spindle shaft 132a disposed at a predetermined position of one side thereof so as to be positioned within the guide box 120.

The actuator 130 consists of a gear box 132 including the spindle shaft 132a and a motor 134 coupled to the gear box 132. The motor 134 is securely fixed by means of a clamp 136 included in the gear box 132.

The spindle shaft 132a has right-hand threads and left-hand threads formed thereon so as to be symmetrical with each other based on an intermediate portion thereof so that a pair of spindle nuts 140 which will be described later is slidably moved simultaneously in opposite directions to each other along with the rotation of the spindle shaft 132a.

In this case, preferably, the spindle shaft 132a includes a stopper 133 formed at a central portion and a distal end portion thereof so as to restrict the movement distance of the spindle nuts 140.

The pair of spindle nuts 140 is screw-coupled to the spindle shaft 132a so as to be spaced apart from each other so that the spindle nuts 140 are slidably moved in opposite directions to each other along with the rotation of the spindle shaft 132a.

In this case, each of the pair of spindle nuts 140 has an insertion hole 142 formed therein so as to allow the spindle shaft 132a to be insertingly coupled thereto, and a coupling groove 144 formed on the underside thereof so as to allow a pair of cables 150 which will be described later to be coupled at ends thereof to the coupling grooves 144.

Besides, each of the pair of spindle nuts 140 has an upper rib 140a formed on a top thereof and two side ribs 140b respectively formed at both sides thereof so as to be symmetrical with each other. In this case, when the upper and lower housings 122 and 124 of the guide box 120 are coupled to each other, each of the pair of guide protrusions 126a protrudingly formed on the guide grooves 126 of the upper and lower housings 122 and 124 is seated between the two side ribs 140 formed at both sides of the spindle nut 140.

In this case, the upper rib 140a and the side ribs 140b serves to reduce a frictional force generated between the outer surface of the spindle nut 140 and the inner surfaces of the guide grooves 126 when the spindle nut 140 is slidably moved along the spindle shaft 132a.

The pair of cables 150 serves to allow the suspension mat 110 to be moved in forward and backward directions. The pair of cables 150 is coupled at one ends thereof to the seat back frame and is coupled at the other ends thereof to the pair of spindle nuts.

In this case, the one ends of the pair of cables 150 are preferably coupled to the seat back frame 10 by means of a pair of mounting clips 152. Alternatively, rings (not shown) may be formed at the ends of the cables 150 coupled to the seat back frame 10.

In addition, the respective one ends of the pair of cables 150 can be coupled to a pair of coupling members 160 disposed at predetermined lengthwise positions of both sides of the seat back frame 10.

Each of the coupling members 160 includes a body 162 coupled to the predetermined lengthwise position of each of both sides of the seat back frame 10, an incision groove 164 formed at a predetermined position of the body 162, and a seating part 166 formed in the body 162 so as to fluidically communicate with the incision groove 164, the seating part having an inclined surface 166a formed on the inner peripheral surface thereof in a shape which is gradually reduced in width as it goes toward the bottom from the top thereof.

Referring to FIG. 3, when the pair of spindle nuts 140 is moved in opposite directions so as to be far from each other on the spindle shaft 132a, predetermined lengthwise portions of the pair of cables 150 are bent backwardly from the suspension mat 110 to support the suspension mat 110. On the other hand, when the pair of spindle nuts 140 is moved in opposite directions so as to close to each other on the spindle shaft 132a, the predetermined lengthwise bent portions of the pair of cables 150 are stretched due to the restricted length of the pair of cables 150 to cause the suspension mat 110 to be forwardly moved.

Hereinafter, the operation of the lumbar support assembly as constructed above will be described.

When an occupant operates the actuator 130, the spindle shaft 132a is forwardly rotated to cause the pair of spindle nuts 140 disposed spaced apart from each other on the spindle shaft 132a to be slidably moved so as to close to each other.

When the pair of spindle nuts 140 is slidably moved so as to close to each other, the predetermined lengthwise portions of the pair of cables 150, which are bent backwardly from the suspension mat 110 to support the suspension mat 110, are stretched to cause the suspension mat 110 to be moved pushingly forwardly to support the back region of the occupant.

On the contrary, the backward movement of the suspension mat 110 to its original position is carried out by an operation in which the spindle shaft 132a is reversely rotated to cause the pair of spindle nuts 140 to be slidably moved so as to far from each other, an elastic restoring force of a seat foam, and a load applied to the seat back by the occupant.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

What is claimed is:

1. A lumbar support assembly installed at a seat back frame at the inside of a vehicle seat and configured to support the back region of an occupant, comprising:
  a suspension mat coupled to the seat back frame;
  a guide box coupled to the suspension mat, wherein the guide box is formed in a half-divided shape and composed of upper and lower housings that are coupled to each other, and both the upper and lower housings of the guide box have
    a pair of guide grooves respectively formed on opposed inner surfaces thereof configured to confront each other, and
    a pair of guide protrusions longitudinally formed on the pair of guide grooves respectively formed on the opposed inner surfaces thereof;
  an actuator coupled to the guide box and including a spindle shaft disposed at one side thereof configured to be positioned within the guide box;
  a pair of spindle nuts screw-coupled to the spindle shaft and slidably moved in opposite directions to each other along with the rotation of the spindle shaft, wherein each of the pair of spindle nuts has an upper rib formed on a top thereof and two side ribs respectively formed at both sides thereof configured to be symmetrical with each other, so that each of the pair of guide protrusions is seated between the respective two side ribs; and a pair of cables coupled at one ends thereof to the seat back frame and coupled at the other ends thereof to the pair of spindle nuts.

2. The lumbar support assembly as claimed in claim 1, wherein the suspension mat includes at least two tension springs disposed at each of both upper sides thereof configured to be coupled to the seat back frame, and a fixed wire disposed at one lower side thereof configured to be coupled to a lower portion of the seat back frame by means of a wire clip.

3. The lumbar support assembly as claimed in claim 1, wherein the seat back frame comprises a pair of coupling members disposed at predetermined lengthwise positions of both sides thereof so that the respective one ends of the pair of cables are coupled to the pair of coupling members, and wherein each of the coupling members comprises a body coupled to the predetermined lengthwise position of each of both sides of the seat back frame, an incision groove formed at a predetermined position of the body, and a seating part formed in the body so as to fluidically communicate with the incision groove, the seating part having an inclined surface formed on the inner peripheral surface thereof in a shape which is gradually reduced in width as it goes toward the bottom from the top thereof.

4. The lumbar support assembly as claimed in claim 1, wherein each of the pair of guide grooves has a closed bottom, the closed bottom of the guide grooves and the guide box defining a space.

5. The lumbar support assembly as claimed in claim 1, wherein when the spindle nut is slidably moved, only the upper rib and the side ribs of the spindle nut contact the inner surface of the guide grooves.

* * * * *